(12) United States Patent
de Montmorillon et al.

(10) Patent No.: US 8,428,411 B2
(45) Date of Patent: Apr. 23, 2013

(54) SINGLE-MODE OPTICAL FIBER

(75) Inventors: Louis-Anne de Montmorillon, Versailles (FR); Simon Richard, Villebon sur Yvette (FR); Pierre Sillard, Le Chesnay (FR)

(73) Assignee: Draka Comteq, B.V., Amsterdam (NL)

( * ) Notice: Subject to any disclaimer, the term of this patent is extended or adjusted under 35 U.S.C. 154(b) by 233 days.

(21) Appl. No.: 13/048,028

(22) Filed: Mar. 15, 2011

(65) Prior Publication Data

US 2011/0229101 A1 Sep. 22, 2011

(30) Foreign Application Priority Data

Mar. 17, 2010 (FR) ..................... 10 51879

(51) Int. Cl.
*G02B 6/028* (2006.01)
*G02B 6/036* (2006.01)

(52) U.S. Cl.
USPC ........................... 385/124; 385/126; 385/127

(58) Field of Classification Search .................. 385/27, 385/28, 123, 124, 126, 127, 128, 141
See application file for complete search history.

(56) References Cited

U.S. PATENT DOCUMENTS

| | | | |
|---|---|---|---|
| 4,838,643 A | 6/1989 | Hodges et al. | |
| 5,194,714 A | 3/1993 | Le Sergent | |
| 5,522,007 A | 5/1996 | Drouart et al. | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,202,447 B1 | 3/2001 | Drouart et al. | |
| 6,210,802 B1 | 4/2001 | Risch et al. | |

(Continued)

FOREIGN PATENT DOCUMENTS

| | | | |
|---|---|---|---|
| EP | 1698920 A1 | 9/2006 | |
| EP | 1785754 A1 | 5/2007 | |

(Continued)

OTHER PUBLICATIONS

French Search Report and Written Opinion in counterpart French Application No. 1051879 dated Oct. 29, 2010, pp. 1-6.

(Continued)

*Primary Examiner* — Brian Healy
(74) *Attorney, Agent, or Firm* — Summa, Additon & Ashe, P.A.

(57) ABSTRACT

The present invention embraces a single-mode optical fiber typically having reduced bending losses. The optical fiber includes a central core, an intermediate cladding, a buried trench, and an outer cladding. The optical fiber typically has (i), at a wavelength of 1310 nanometers, a mode field diameter with a nominal value of between about 8.6 microns and 9.5 microns (and a tolerance of ±0.4 micron), (ii) a cable cut-off wavelength of no more than 1260 nanometers, and (iii), for a bending radius of 15 millimeters at a wavelength of 1550 nanometers, bending losses of no more than 0.03 dB/turn.

30 Claims, 1 Drawing Sheet

U.S. PATENT DOCUMENTS

| | | |
|---|---|---|
| 6,215,931 B1 | 4/2001 | Risch et al. |
| 6,269,663 B1 | 8/2001 | Drouart et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,187,833 B2 | 3/2007 | Mishra |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,817,891 B2 | 10/2010 | Lavenne et al. |
| 7,889,960 B2 | 2/2011 | de Montmorillon et al. |
| 2005/0244120 A1 | 11/2005 | Mishra |
| 2006/0198589 A1 | 9/2006 | Sako et al. |
| 2008/0056658 A1 | 3/2008 | Bickham et al. |
| 2008/0226241 A1 | 9/2008 | Sugizaki et al. |
| 2008/0292262 A1 | 11/2008 | Overton et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0027951 A1 | 2/2010 | Bookbinder et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0254653 A1 | 10/2010 | Molin et al. |
| 2010/0310218 A1 | 12/2010 | Molin et al. |
| 2011/0026889 A1 | 2/2011 | Risch et al. |
| 2011/0044595 A1 | 2/2011 | Sillard et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0229101 A1* | 9/2011 | de Montmorillon et al. . 385/124 |
| 2012/0040184 A1* | 2/2012 | de Montmorillon et al. . 428/376 |

FOREIGN PATENT DOCUMENTS

| | | |
|---|---|---|
| EP | 1845399 A1 | 10/2007 |
| EP | 1921478 A1 | 5/2008 |
| EP | 1930753 A1 | 6/2008 |
| EP | 2116877 A1 | 11/2009 |
| EP | 2116878 A1 | 11/2009 |
| EP | 2369379 A1 | 9/2011 |
| WO | 2005/106544 A1 | 11/2005 |
| WO | 2009/062131 A1 | 5/2009 |

OTHER PUBLICATIONS

European Search Report and Written Opinion in counterpart European Application No. 11157416.6 dated Jun. 10, 2011, pp. 1-6.

* cited by examiner

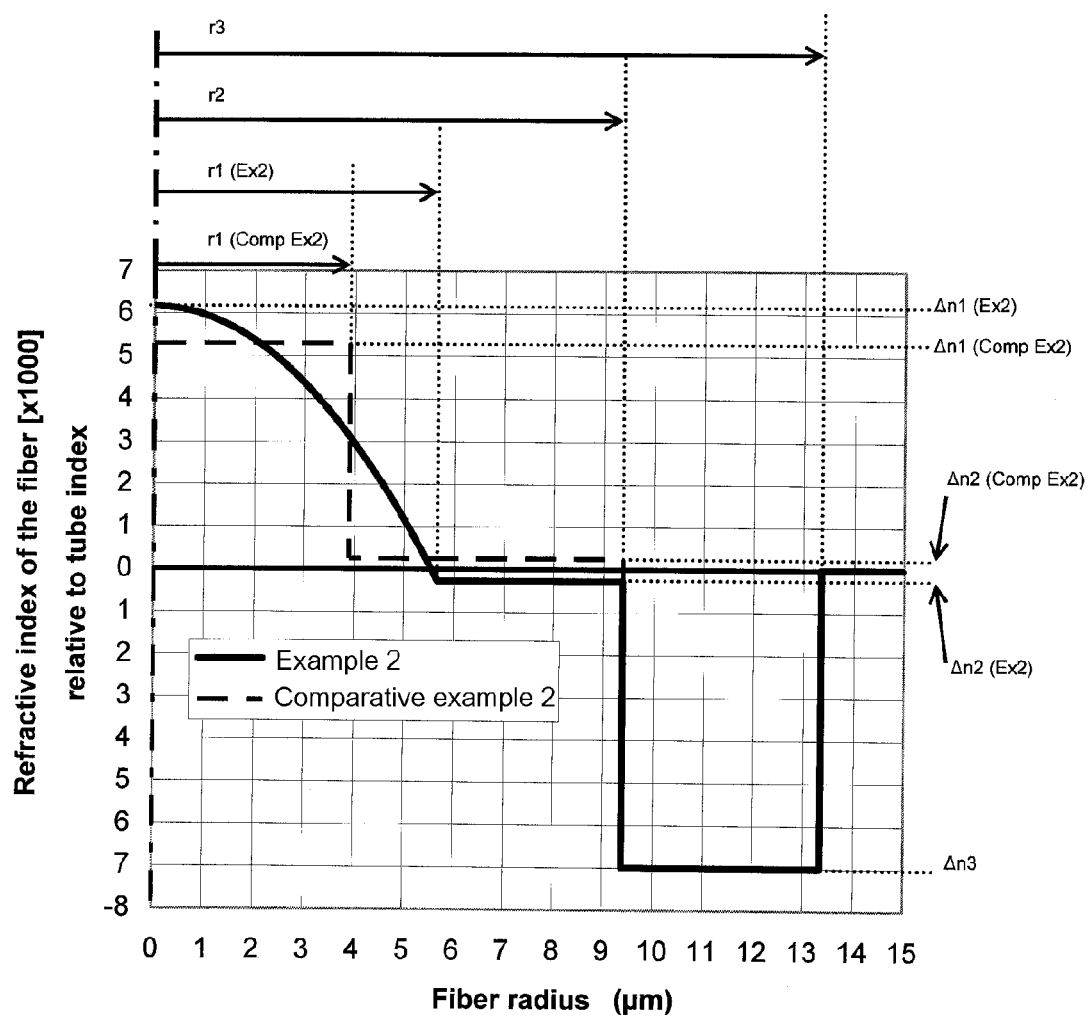

SINGLE-MODE OPTICAL FIBER

CROSS-REFERENCE TO PRIORITY APPLICATION

This application hereby claims the benefit of pending French application No. 10/51879 (filed Mar. 17, 2010, at the National Institute of Industrial Property (France)), which is hereby incorporated by reference in its entirety.

FIELD OF THE INVENTION

The present invention relates to the field of optical-fiber transmission and, more specifically, to an optical fiber having reduced bending losses.

BACKGROUND

An optical fiber's refractive-index profile is generally described as a relationship of refractive index and the optical fiber's radius. Conventionally, the distance r from the center of the optical fiber is plotted along the abscissa (i.e., the x axis), and the difference between the refractive index at a distance r and the refractive index of the outer cladding of the optical fiber is plotted along the ordinate (i.e., the y axis). The outer cladding, functioning as an optical cladding, typically has a refractive index that is substantially constant. This outer cladding is typically made of pure silica but may also contain one or more dopants.

The refractive-index profile may have a "step" profile, a "trapezoidal" profile, a "parabolic" profile (e.g., an "alpha" profile), or a "triangular" profile, which can be graphically depicted as a step, trapezoidal, parabolic, or triangular shape, respectively. These curves are generally representative of the theoretical or design profile of the optical fiber. Constraints associated with optical-fiber fabrication may lead in practice to a profile that is perceptibly different.

An optical fiber conventionally includes an optical core, which has the function of transmitting and optionally amplifying an optical signal. A conventional optical fiber also typically includes an optical cladding, which confines the optical signal in the core. For this purpose, the refractive index of the core $n_c$ is typically greater than the refractive index of the cladding $n_g$ (i.e., $n_c > n_g$). As will be understood by those having ordinary skill in the art, the propagation of an optical signal in a single-mode optical fiber includes a fundamental mode, typically denoted LP01, which is guided in the core, and secondary modes, which are guided over a certain distance in the core and the optical cladding.

Single-mode optical fibers (SMFs) with step-index profile are often used within optical-fiber transmission systems. Such optical fibers typically possess a chromatic dispersion and a chromatic-dispersion slope that comply with specific telecommunications standards.

Conventionally, so-called "standard" single-mode fibers (SSMFs) are used for land-based transmission systems. To facilitate compatibility between optical systems from different manufacturers, the International Telecommunication Union (ITU) has defined a standard reference ITU-T G.652 with which a standard optical transmission fiber (i.e., a standard single-mode fiber or SSMF) should comply. The ITU-T G.652 recommendations (November 2009) and each of its attributes (i.e., A, B, C, and D) are hereby incorporated by reference.

Among other recommendations for a transmission fiber, the ITU-T G.652 standard recommends (i) a mode field diameter (MFD) with a nominal value (e.g., a nominal mode field diameter) of between 8.6 microns (μm) and 9.5 microns and a tolerance of ±0.6 micron at a wavelength of 1310 nanometers (nm), (ii) a maximum cable cut-off wavelength ($\lambda_{CC}$) of 1260 nanometers (nm), (iii) a zero-dispersion wavelength (ZDW) of between 1300 nanometers and 1324 nanometers, and (iv) a maximum zero-dispersion slope (ZDS) of 0.092 picoseconds per square nanometer kilometer (ps/(nm²·km)) (i.e., the chromatic-dispersion slope at the zero-chromatic-dispersion wavelength is 0.092 ps/(nm²·km) or less).

The cable cut-off wavelength is conventionally measured as being the wavelength at which the optical signal is no longer single mode after propagating over 22 meters in the optical fiber, as defined by subcommittee 86A of the International Electrotechnical Commission (IEC) in standard IEC 60793-1-44. The IEC 60793-1-44 is hereby incorporated by reference in its entirety.

In most circumstances, the secondary mode that best withstands bending losses is the LP11 mode. The cable cut-off wavelength is thus the wavelength from which the LP11 mode is sufficiently attenuated after propagating for 22 meters in an optical fiber. The method proposed by the ITU-T G.652 standard considers that the optical signal is single mode as long as the attenuation of the LP11 mode is greater than or equal to 19.3 decibels (dB). According to the recommendations of IEC subcommittee 86A in standard IEC 60793-1-44, the cable cut-off wavelength is determined by imparting two loops having a radius of 40 millimeters (mm) in the optical fiber, while arranging the remainder of the optical fiber (i.e., 21.5 meters of optical fiber) on a mandrel having a radius of 140 millimeters.

For a given fiber, a MAC value is defined as being the radius of the mode diameter of the optical fiber at 1550 nanometers over the fiber cut-off wavelength ($\lambda_C$) (i.e., "effective cut-off wavelength"). The fiber cut-off wavelength is conventionally measured as the wavelength at which the optical signal is no longer single mode after propagating over two meters of fiber, as defined by IEC subcommittee 86A in the standard IEC 60793-1-44. The MAC value constitutes a parameter for assessing the performance of the optical fiber, particularly for finding a compromise between the mode field diameter, the fiber cut-off wavelength, and bending losses.

Commonly owned European Patent No. 2,116,878 (and its counterpart U.S. Patent Application Publication No. 2009/0279835), commonly owned European Patent No. 2,116,877 (and its counterpart U.S. Pat. No. 7,889,960), commonly owned European Patent No. 1,930,753 (and its counterpart U.S. Pat. No. 7,555,186), commonly owned European Patent No. 1,845,399 (and its counterpart U.S. Pat. No. 7,587,111), and commonly owned European Patent No. 1,785,754 (and its counterpart U.S. Pat. No. 7,623,747), each of which is hereby incorporated by reference in its entirety, propose single-mode optical fibers having limited bending losses. European Patent Nos. 1,845,399 and 1,785,754 have experimental results showing a relationship between (i) the MAC value at a wavelength of 1550 nanometers and (ii) bending losses at a wavelength of 1625 nanometers with a radius of curvature of 15 millimeters in a step-index standard single-mode fiber. These documents establish that the MAC value has an influence on optical-fiber bending losses. Moreover, these documents demonstrate that bending losses can be reduced by reducing the MAC value.

Unfortunately, reducing the MAC value by reducing the mode diameter and/or by increasing the fiber cut-off wavelength ($\lambda_C$) can lead to noncompliance with the ITU-T G.652 recommendations, thereby making an optical fiber commercially incompatible with certain transmission systems.

Accordingly, reducing bending losses while remaining compliant with industry recommendations constitutes a genuine challenge for fiber applications for use in various optical-fiber systems (e.g., fiber to the home (FTTH)).

The ITU (International Telecommunication Union) has also defined standards relating to bend-insensitive optical fibers, in particular the ITU-T G.657.A standards (e.g., the ITU-T G.657.A1 (November 2009) and the ITU-T G.657.A2 (November 2009) subcategories) and ITU-T G.657.B standards (e.g., the ITU-T G.657.B2 (November 2009) and the ITU-T G.657.B3 (November 2009) subcategories). The ITU-T G.657.A recommendations impose bending loss limits but seek above all to maintain compatibility with the ITU-T G.652 recommendations (e.g., the ITU-T G.652.D recommendations), particularly with respect to mode field diameter and chromatic dispersion. In contrast, the ITU-T G.657.B recommendations do not impose compatibility with ITU-T G.652 recommendations but impose stricter limits on bending losses than those imposed by the ITU-T G.657.A1 recommendations.

Aforementioned European Patent Nos. 1,845,399 and 1,785,754 propose fiber profiles that facilitate limited bending losses typically satisfying ITU-T G.657 A/B recommendations.

U.S. Pat. No. 7,187,833, which is hereby incorporated by reference in its entirety, proposes parabolic profiles for optical fibers that include a trench, seeking to obtain a large effective area and low attenuation as a function of distance. Nevertheless, U.S. Pat. No. 7,187,833 does not seek to reduce bending losses. Moreover, none of the profiles it proposes comply with any of the ITU-T G.657.A2/B2/B3 recommendations.

Table 1 (below) gives the maximum acceptable macrobending loss for the ITU-T G.652.D and G.657.A1/A2/B2/B3 recommendations for various radii of curvature at wavelengths of 1550 nanometers and 1625 nanometers.

TABLE 1

| radius (mm) | turns | wavelength (nm) | maximum acceptable macrobending losses (dB) | | | | |
|---|---|---|---|---|---|---|---|
| | | | G.652.D | G.657.A1 | G.657.A2 | G.657.B2 | G.657.B3 |
| 30 | 100 | 1550 | | | | | |
| 30 | 100 | 1625 | 0.1 | | | | |
| 15 | 10 | 1550 | | 0.25 | 0.03 | | |
| 15 | 10 | 1625 | | 1 | 0.1 | | |
| 10 | 1 | 1550 | | 0.75 | 0.1 | 0.03 | |
| 10 | 1 | 1625 | | 1.5 | 0.2 | 0.1 | |
| 7.5 | 1 | 1550 | | | 0.5 | 0.08 | |
| 7.5 | 1 | 1625 | | | 1 | 0.25 | |
| 5 | 1 | 1550 | | | | 0.15 | |
| 5 | 1 | 1625 | | | | 0.45 | |

For the ITU-T G.652 and G.657.A/B recommendations, Table 2 (below) depicts (i) the nominal value ranges and tolerances associated with the mode field diameter, (ii) the maximum values for the cable cut-off wavelength ($\lambda_{CC}$), and (iii) the values for the chromatic-dispersion parameters. The chromatic-dispersion parameters $\lambda_{0min}$ and $\lambda_{0max}$ designate the minimum and maximum zero-chromatic-dispersion wavelengths (ZDW), respectively. The parameter $S_{0max}$ designates the maximum value for the zero-chromatic-dispersion slope (ZDS).

TABLE 2

| | G.652.D | G.657.A | G.657.B |
|---|---|---|---|
| Nominal MFD (@ 1310 nm) (μm) | 8.6-9.5 | 8.6-9.5 | 6.3-9.5 |
| Tolerance (μm) | ±0.6 | ±0.4 | ±0.4 |
| Maximum cable cut-off wavelength (nm) | 1260 | 1260 | 1260 |
| $\lambda_{0\,min}$ (nm) | 1300 | 1300 | |
| $\lambda_{0\,max}$ (nm) | 1324 | 1324 | |
| $s_{0\,max}$ (nm) | 0.092 | 0.092 | |

Various refractive-index profiles have been proposed to comply with the criteria of the ITU-T G.657.A/B recommendations.

For example, optical fibers having a simple step-index profile have been proposed. These step-index profiles have MAC values selected to ensure conformity with the bending loss parameters of the ITU-T G.657.A1 recommendations. Such an optical fiber is sold by Draka under the trademark BendBright®. Nevertheless, when these profiles comply with the ITU-T G.657.B2 recommendations, they do not necessarily comply with the ITU-T G.657.A or G.652 recommendations because of a small mode field diameter.

Furthermore, optical fibers have been proposed having a step-index profile with a trench in the cladding so as to provide conformity with the ITU-T G.657.A2/B2 recommendations (e.g., fiber sold by Draka under the trademark BendBright-XS®) or the ITU-T G.657.B3 recommendations (e.g., fiber sold by the Applicant under the trademark BendBright-Elite®). By way of example, the trench may be made by adding dopants (e.g., fluorine or boron) for reducing the refractive index. Solutions of this kind are known as solid-trench-assisted (STA). The trench may also be obtained by incorporating holes (i.e., hole-assisted (HA)) or bubbles (i.e., bubble-assisted (BA)).

Nevertheless, those present-day solutions require strict control over the MAC value, and consequently over the mode field diameter and the cut-off wavelength, in order to comply with all of the constraints of the ITU-T G.657 and G.652 recommendations, while also maintaining good yields, in particular by minimizing the production of noncompliant fibers.

SUMMARY

Accordingly, in one aspect, the present invention embraces an optical fiber that provides better resistance to bending losses than the limits set by the ITU-T G.657.A recommendations and the ITU-T G.657.B recommendations for a given mode field diameter (MFD), a given cable cut-off wavelength, and a given zero-chromatic-dispersion wavelength (ZDW), while remaining compatible with ITU-T G.652 recommendations.

In this regard, the present invention embraces an optical-fiber profile that includes a central core, an intermediate cladding, and a buried trench. The core employs a parabolic profile (e.g., an alpha-index profile) instead of a step-index profile. It has been observed that the parabolic-index profile enables reduced bending losses (e.g., by as much as 30 percent) compared with a step-index profile, with the mode field diameter (MFD), cable cut-off wavelength ($\lambda_{CC}$) and zero-chromatic-dispersion wavelength (ZDW) characteristics otherwise remaining substantially the same.

A reduction in bending losses makes it possible to enlarge the acceptable window for MAC values by about 0.05, which represents a significant improvement compared with prior optical-fiber designs.

The present invention also facilitates an increased tolerance to variability in the optical-fiber fabrication process.

In a particular embodiment, the present invention embraces a single-mode optical fiber that includes, from its center towards its periphery, (i) a central core, (ii) an intermediate cladding, (iii) a buried trench, and (iv) an outer cladding.

The central core has a radius $r_1$ and a positive index difference $\Delta n(r)$ relative to the outer cladding. The radius $r_1$ of the central core is typically between about 4.9 microns and 6.6 microns. The maximum refractive-index difference $\Delta n_1$ between the central core and the outer cladding is typically between $5.3 \times 10^{-3}$ and $7.0 \times 10^{-3}$. The central core typically possesses an alpha-index profile where the alpha parameter $\alpha$ is equal to $2 \pm 0.5$.

The intermediate cladding has a radius $r_2$ and an index difference $\Delta n_2$ relative to the outer cladding. The refractive-index difference $\Delta n_2$ between the intermediate cladding and the outer cladding is typically between $-1 \times 10^{-3}$ and $1 \times 10^{-3}$. In one exemplary embodiment, the intermediate cladding's refractive index difference $\Delta n_2$ is positive (e.g., at least about $0.1 \times 10^{-3}$). In an alternative exemplary embodiment, the intermediate cladding's refractive index difference $\Delta n_2$ is negative (e.g., no more than about $-0.1 \times 10^{-3}$).

The buried trench has a radius $r_3$ and a negative index difference $\Delta n_3$ relative to the outer cladding. The refractive-index difference $\Delta n_3$ between the buried trench and the outer cladding is typically between $-10 \times 10^{-3}$ and $-1.4 \times 10^{-3}$.

An optical fiber in accordance with the present invention typically has (i), at a wavelength of 1310 nanometers, a mode field diameter with a nominal value of between 8.6 microns and 9.5 microns and a tolerance of ±0.4 micron, (ii) a cable cut-off wavelength of no more than 1260 nanometers, and (iii), for a radius of curvature (i.e., bending radius) of 15 millimeters at a wavelength of 1550 nanometers, bending losses of no more than 0.003 dB/turn.

The central core may have a surface integral $V_{01}$ of between about $22 \times 10^{-3}$ micron and $25 \times 10^{-3}$ micron. The surface integral $V_{01}$ of the central core is defined as follows:

$$V_{01} = \int_0^{r_1} \Delta n(r) \cdot dr \approx r_1 \times (\text{alpha} \cdot \Delta n_1 + \Delta n_2)/(\text{alpha} + 1)$$

The central core may also have a volume integral $V_n$ of between about $87 \times 10^{-3}$ $\mu m^2$ and $103 \times 10^{-3}$ $\mu m^2$. The surface volume $V_{11}$ of the central core is defined as follows:

$$V_{11} = 2 \cdot \int_0^{r_1} \Delta n(r) \cdot r \cdot dr \approx r_1^2 \times (\text{alpha} \cdot \Delta n_1 + 2 \cdot \Delta n_2)/(\text{alpha} + 2)$$

The buried trench may have a surface integral $V_{03}$ of between about $-45 \times 10^{-3}$ micron and $-25 \times 10^{-3}$ micron. The surface integral $V_{03}$ of the buried trench is defined as follows:

$$V_{03} = \int_{r_2}^{r_3} \Delta n(r) \cdot dr \approx (r_3 - r_2) \times \Delta n_3$$

The buried trench may also have a volume integral $V_{13}$ of between about $-1020 \times 10^{-3}$ $\mu m^2$ and $-500 \times 10^{-3}$ $\mu m^2$. The volume integral $V_{11}$ of the buried trench is defined as follows:

$$V_{13} = 2 \cdot \int_{r_2}^{r_3} \Delta n(r) \cdot r dr \approx (r_3^2 - r_2^2) \times \Delta n_3$$

In one embodiment, the ratio of the central core's radius to the intermediate cladding's radius (i.e., $r_1/r_2$) is between 0.5 and 0.9.

In yet another embodiment, the mean value of the intermediate cladding's radius and the buried trench's radius (i.e., $(r_2+r_3)/2$) is between 9.5 microns and 15.5 microns.

In yet another embodiment, the optical fiber has, at a wavelength of 1550 nanometers, (i) bending losses of between about $0.060 \times 10^{-3}$ dB/turn and $1.48 \times 10^{-3}$ dB/turn for a radius of curvature of 15 millimeters, (ii) bending losses of between about $3 \times 10^{-3}$ dB/turn and $36 \times 10^{-3}$ dB/turn for a radius of curvature of 10 millimeters, (iii) bending losses of between about 0.01 dB/turn and 0.14 dB/turn for a radius of curvature of 7.5 millimeters, and/or (iv) bending losses of between about 0.03 dB/turn and 0.41 dB/turn for a radius of curvature of 5 millimeters.

In yet another embodiment, the optical fiber has, at a wavelength of 1625 nanometers, (i) bending losses of between about $0.5 \times 10^{-3}$ dB/turn and $8.9 \times 10^{-3}$ dB/turn for a radius of curvature of 15 millimeters, (ii) bending losses of between about 0.011 dB/turn and 0.112 dB/turn for a radius of curvature of 10 millimeters, (iii) bending losses of between about 0.03 dB/turn and 0.32 dB/turn for a radius of curvature of 7.5 millimeters, and/or (iv) bending losses of between about 0.08 dB/turn and 1.13 dB/turn for a radius of curvature of 5 millimeters.

In yet another embodiment, the optical fiber has a zero-chromatic-dispersion wavelength (ZDW) of between 1300 nanometers and 1324 nanometers.

In yet another embodiment, the optical fiber has, at the zero-chromatic-dispersion wavelength, a chromatic-dispersion slope (ZDS) that is 0.092 ps/(nm²·km) or less.

In another aspect, the present invention embraces an optical box receiving at least a portion of the present optical fiber. Within the optical box, the optical fiber may be arranged with a radius of curvature of less than 15 millimeters (e.g., a radius of curvature of less than 5 millimeters).

In yet another aspect, the present invention embraces a fiber-to-the-home (FTTH) system that includes at least a portion of the present optical fiber.

The foregoing illustrative summary, as well as other exemplary objectives and/or advantages of the invention, and the manner in which the same are accomplished, are further explained within the following detailed description and its accompanying drawing.

BRIEF DESCRIPTION OF THE DRAWING

FIG. 1 depicts a refractive-index profile for an exemplary optical fiber according to the present invention. This refractive-index profile is a design profile, which is representative of the optical fiber's theoretical profile.

DETAILED DESCRIPTION

In one aspect, the present invention embraces an optical fiber that includes (i) a central core, (ii) an intermediate cladding, (iii) a buried trench (e.g., a depressed cladding), and (iv) an outer cladding.

The central core has a radius $r_1$ and an index difference $\Delta n(r)$ relative to the outer cladding, which acts as an optical cladding. The refractive index of the core typically has a parabolic shape. Accordingly, the refractive-index difference $\Delta n(r)$ between the central core and the outer cladding depends on the distance r from the center of the optical fiber (e.g., decreasing as the distance from the center of the optical fiber increases). Thus, the central core defines a maximum refractive-index difference $\Delta n_1$ with respect to the outer cladding. As used herein, the term "refractive-index difference" does not exclude a refractive-index difference of zero.

The intermediate cladding has (i) a radius $r_2$ and (ii) a refractive-index difference $\Delta n_2$ with respect to the outer cladding that is typically constant. The buried trench has (i) a radius $r_3$ and (ii) a refractive-index difference $\Delta n_3$ with respect to the outer cladding that is typically constant. As used herein, the term "buried trench" is used to designate a radial portion of the optical fiber having a refractive index lower than the refractive index of the outer cladding.

The central core's refractive-index difference $\Delta n(r)$ with respect to the outer cladding may be described by the following equation:

$$\Delta n(r) = \Delta n_1 + (\Delta n_2 - \Delta n_1) \cdot (r/r_1)^{alpha}$$

At the center of the central core (i.e., where r=0), the refractive-index difference $\Delta n(r)$ is typically the central core's maximum refractive-index difference $\Delta n_1$. At the edge of the central core (i.e., where $r=r_1$), the refractive-index difference $\Delta n(r)$ is typically equal to the intermediate cladding's refractive-index difference $\Delta n_2$.

The central core typically has an alpha-index profile. An alpha refractive-index profile may be described by an alpha parameter $\alpha$ (i.e., alpha), which is a non-dimensional parameter that is indicative of the shape of the index profile.

An optical fiber with an alpha-index profile typically has a core profile with a rotational symmetry such that, along any radial direction of the optical fiber, the value of the refractive index decreases continuously from the center of the optical fiber's core to its periphery.

A true parabolic shape is obtained when the alpha parameter $\alpha$ is equal to 2. That said, an alpha parameter $\alpha$ of between about 1.5 and 2.5 still facilitates desirable fiber characteristics. Accordingly, the alpha parameter $\alpha$ of the present optical fiber is typically between 1.5 and 2.5.

Each section of the optical fiber profile may be defined using surface integrals and volume integrals. The term "surface" should not be understood geometrically but rather should be understood as a value having two dimensions. Similarly, the term "volume" should not be understood geometrically but rather should be understood as a value having three dimensions.

Accordingly, the central core may define a surface integral $V_{01}$, the intermediate cladding may define a surface integral $V_{02}$, and the buried trench may define a surface integral $V_{03}$. As used herein, these surface integrals are defined by the following equations, respectively:

$$V_{01} = \int_0^{r_1} \Delta n(r) \cdot dr \approx r_1 \times (alpha \cdot \Delta n_1 + \Delta n_2)/(alpha + 1)$$

$$V_{02} = \int_{r_1}^{r_2} \Delta n(r) \cdot dr \approx (r_2 - r_1) \times \Delta n_2$$

$$V_{03} = \int_{r_2}^{r_3} \Delta n(r) \cdot dr \approx (r_3 - r_2) \times \Delta n_3$$

Moreover, the central core may define a volume integral $V_{11}$, the intermediate cladding may define a volume integral $V_{12}$, and the buried trench may define a volume integral $V_{13}$. As used herein, these volume integrals are defined by the following equations, respectively:

$$V_{11} = 2 \cdot \int_0^{r_1} \Delta n(r) \cdot r \cdot dr \approx r_1^2 \times (alpha \cdot \Delta n_1 + 2 \cdot \Delta n_2)/(alpha + 2)$$

$$V_{12} = 2 \cdot \int_{r_1}^{r_2} \Delta n(r) \cdot r \cdot dr \approx (r_2^2 - r_1^2) \times \Delta n_2$$

$$V_{13} = 2 \cdot \int_{r_2}^{r_3} \Delta n(r) \cdot r dr \approx (r_3^2 - r_2^2) \times \Delta n_3$$

Table 3 (below) depicts three prophetic, exemplary parabolic-core fiber profiles in accordance with the present invention. Table 3 also depicts three prophetic, comparative step-index fiber profiles. The values in Table 3 correspond to theoretical, modeled refractive-index profiles.

The first column of Table 3 lists the exemplary and comparative optical fibers. The second column specifies whether the core has a step-index profile or a parabolic profile. The next three columns provide the core radius, the intermediate-cladding radius, and the buried trench radius. The last three columns depict index differences relative to the outer cladding. The refractive-index differences in Table 3 have been multiplied by 1000, as have the ordinate values in FIG. 1. The refractive-index values were measured at a wavelength of 633 nanometers.

TABLE 3

| | core | $r_1$ (µm) | $r_2$ (µm) | $r_3$ (µm) | $\Delta n_1$ | $\Delta n_2$ | $\Delta n_3$ |
|---|---|---|---|---|---|---|---|
| Comp. Ex. 1 | step | 3.93 | 9.38 | 14.72 | 5.33 | 0.13 | −5.01 |
| Ex. 1 | parabola | 5.76 | 9.38 | 14.72 | 6.21 | −0.46 | −5.01 |
| Comp. Ex. 2 | step | 3.89 | 9.38 | 13.34 | 5.30 | 0.25 | −7.00 |
| Ex. 2 | parabola | 5.67 | 9.38 | 13.34 | 6.17 | −0.27 | −7.00 |
| Comp. Ex. 3 | step | 3.91 | 9.23 | 14.81 | 5.14 | 0.10 | −7.15 |
| Ex. 3 | parabola | 5.73 | 9.23 | 14.81 | 5.98 | −0.50 | −7.15 |

As depicted in Table 3, the central core typically has a radius $r_1$ of between 5.67 microns and 5.76 microns and a maximum index difference $\Delta n_1$ relative to the outer cladding of between $5.98 \times 10^{-3}$ and $6.21 \times 10^{-3}$. The intermediate cladding typically has a radius $r_2$ of between 9.23 microns and 9.38 microns and an index difference $\Delta n_3$ relative to the outer cladding of between $-0.5 \times 10^{-3}$ and $-0.27 \times 10^{-3}$. The buried trench typically has a radius $r_3$ of between 13.34 microns and 14.81 microns and an index difference $\Delta n_3$ relative to the outer cladding of between $-7.15 \times 10^{-3}$ and $-5.01 \times 10^{-3}$.

Table 4 (below) shows optical transmission characteristics for optical fibers having the refractive-index profiles depicted in Table 3.

The first and second columns identify the exemplary and comparative optical fibers, as well as their respective refractive-index profiles. The next columns provide, for each optical-fiber profile, the cable cut-off wavelength ($\lambda_{CC}$), the fiber cut-off wavelength ($\lambda_C$), the zero-chromatic-dispersion wavelength (ZDW), the dispersion slope (ZDS) (in ps/(nm$^2$·km)) at the zero-chromatic-dispersion wavelength, and the mode field diameters (MFD) at wavelengths of 1310 nanometers and 1550 nanometers, respectively.

Table 5 (below) shows bending losses (dB/turn) for optical fibers having the refractive-index profiles depicted in Table 3 for the wavelengths of 1550 nanometers and 1625 nanometers for radii of curvature of 15 millimeters, 10 millimeters, 7.5 millimeters, and 5 millimeters. Here, the bending-loss differences between the values for a step profile and the values for a parabolic profile are expressed as a percentage.

dispersion slope (ZDS), and (iv) mode field diameter (MFD) as the comparative optical fibers.

Moreover, the optical fiber in accordance with the present invention typically has optical transmission parameters in compliance with the ITU-T G.652 and G.657 recommendations.

Indeed, as shown in Table 4 (above) and in accordance with the ITU-T G.652 recommendations, the present optical fibers typically have (i) a nominal mode field diameter of between 8.6 microns and 9.5 microns at a wavelength of 1310 nanometers, (ii) a zero-chromatic-dispersion wavelength of between 1300 nanometers and 1324 nanometers, and (iii) a maximum chromatic-dispersion slope of no more than 0.092 ps/(nm$^2$·km) at the zero-dispersion wavelength. Furthermore, the present optical fiber typically has a cable cut-off wave-

TABLE 4

|  | core | cable cut-off wavelength (nm) | fiber cut-off wavelength (nm) | ZDW (nm) | ZDS (ps/(nm$^2$·km)) | MFD (@ 1310 nm) (μm) | MFD (@ 1550 nm) (μm) |
|---|---|---|---|---|---|---|---|
| Comp. Ex. 1 | step | 1202 | 1274 | 1319 | 0.087 | 8.76 | 9.84 |
| Ex. 1 | parabola | 1202 | 1280 | 1319 | 0.090 | 8.78 | 9.84 |
| difference Comp. Ex. 1 vs. step & Ex. 1 | parabola | 0 | 6 | 0 | 0.003 | 0.02 | 0.00 |
| Comp. Ex. 2 | step | 1189 | 1248 | 1319 | 0.088 | 8.80 | 9.88 |
| Ex. 2 | parabola | 1189 | 1255 | 1319 | 0.091 | 8.82 | 9.88 |
| difference Comp. Ex. 2 vs. step & Ex. 2 | parabola | 0 | 7 | 0 | 0.003 | 0.02 | 0.00 |
| Comp. Ex. 3 | step | 1227 | 1364 | 1317 | 0.089 | 8.80 | 9.86 |
| Ex. 3 | parabola | 1227 | 1377 | 1317 | 0.091 | 8.82 | 9.86 |
| difference Comp. Ex. 3 vs. step & Ex. 3 | parabola | 0 | 13 | 0 | 0.002 | 0.02 | 0.00 |

TABLE 5

| | Bending losses (@ 1550 nm) (dB/turn) | | | | Bending losses (@ 1625 nm) (dB/turn) | | | |
|---|---|---|---|---|---|---|---|---|
| | 15-mm bend radius | 10-mm bend radius | 7.5-mm bend radius | 5-mm bend radius | 15-mm bend radius | 10-mm bend radius | 7.5-mm bend radius | 5-mm bend radius |
| Comp. Ex. 1 | 0.00089 | 0.024 | 0.091 | 0.22 | 0.0052 | 0.071 | 0.204 | 0.49 |
| Ex. 1 | 0.00063 | 0.018 | 0.071 | 0.17 | 0.0038 | 0.056 | 0.162 | 0.39 |
| difference between Comp. Ex. 1 & Ex. 1 | −29% | −25% | −22% | −23% | −27% | −21% | −21% | −20% |
| Comp. Ex. 2 | 0.00128 | 0.034 | 0.134 | 0.30 | 0.0073 | 0.101 | 0.293 | 0.67 |
| Ex. 2 | 0.00090 | 0.026 | 0.105 | 0.25 | 0.0052 | 0.079 | 0.235 | 0.55 |
| difference between Comp. Ex. 2 & Ex. 2 | −30% | −24% | −22% | −17% | −29% | −22% | −20% | −18% |
| Comp. Ex. 3 | 0.00082 | 0.012 | 0.037 | 0.07 | 0.0044 | 0.035 | 0.082 | 0.16 |
| Ex. 3 | 0.00067 | 0.010 | 0.031 | 0.06 | 0.0036 | 0.029 | 0.069 | 0.14 |
| difference between Comp. Ex. 3 & Ex. 3 | −18% | −17% | −16% | −14% | −18% | −17% | −16% | −13% |

In accordance with Tables 4 and 5 (above), the present optical fibers can have bending losses that are as much as 30 percent less than the comparative optical fibers, which have a step-index profile. Moreover, the present optical fibers typically have substantially the same (i) cable cut-off wavelength, (ii) zero-chromatic-dispersion wavelength (ZDW), (iii) zero-length that is well below 1260 nanometers, the maximum value allowed by the ITU-T G.652 and G.657 recommendations.

It is desirable to produce optical fibers that are suitable for use over all of the transmission bands used by optical systems. In particular, it is desirable to use optical fiber in single-mode propagation from the original band (O-band) (i.e., 1260 nanometers to 1360 nanometers) up to the ultra-long band (U-band) (i.e., greater than 1625 nanometers). A low cut-off wavelength facilitates use of the optical fiber in all available bands.

By comparing Table 5 with Table 1, it can be seen that the bending losses of the present optical fibers (e.g., Examples 1, 2, and 3) typically comply with the limits set by the ITU-T G.652.D and G.657.A1/A2/B2 recommendations. Moreover, the bending losses of Example 3 even comply with the more rigorous limits set by the ITU-T G.657.B3 recommendations.

Thus, with reference to Example 3, the present optical fiber can have, at a wavelength of 1550 nanometers, (i) bending losses of no more than 0.003 dB/turn (e.g., 0.00067 dB/turn) for a bending radius of 15 millimeters, (ii) bending losses of no more than 0.03 dB/turn (e.g., 0.01 dB/turn) for a bending radius of 10 millimeters, (iii) bending losses of no more than 0.08 dB/turn (e.g., 0.031 dB/turn) for a bending radius of 7.5 millimeters, and (iv) bending losses of no more than 0.15 dB/turn (e.g., 0.06 dB/turn) for a bending radius of 5 millimeters.

With further reference to Example 3, the present optical fiber can also have, at a wavelength of 1625 nanometers, (i) bending losses of no more than 0.01 dB/turn (e.g., 0.0036 dB/turn) for a bending radius of 15 millimeters, (ii) bending losses of no more than 0.1 dB/turn (e.g., 0.029 dB/turn) for a bending radius of 10 millimeters, (iii) bending losses of no more than 0.25 dB/turn (e.g., 0.069 dB/turn) for a bending radius of 7.5 millimeters, and (iv) bending losses of no more than 0.45 dB/turn (e.g., 0.14 dB/turn) for a bending radius of 5 millimeters.

Table 6 (below) depicts twelve exemplary parabolic-core fiber profiles in accordance with the present invention. Note that Examples 1-3 in Table 6 are the same as in Table 3. The values in Table 6 correspond to the theoretical, modeled refractive-index profiles.

The first column of Table 6 lists the prophetic, exemplary optical fibers. The second column provides the value of the alpha parameter. The next three columns provide the radii of the core, the intermediate cladding, and the buried trench. The next three columns provide the corresponding index differences relative to the optical cladding. The next two columns provide values for $(r_2+r_3)/2$ and for the ratio $r_1/r_2$, respectively. Finally, the last six columns provide respective values for the surface and volume integrals $V_{01}$, $V_{11}$, $V_{02}$, $V_{12}$, $V_{03}$, and $V_{13}$. As before, the refractive-index differences and the integrals in Table 6 have been multiplied by 1000. The refractive-index values were measured at a wavelength of 633 nanometers.

TABLE 6

| | alpha | $r_1$ (µm) | $r_2$ (µm) | $r_3$ (µm) | $\Delta n_1$ | $\Delta n_2$ | $\Delta n_3$ | $(r_2+r_3)/2$ (µm) | $r_1/r_2$ | $V_{01}$ (µm) | $V_{11}$ (µm²) | $V_{02}$ (µm) | $V_{12}$ (µm²) | $V_{03}$ (µm) | $V_{13}$ (µm²) |
|---|---|---|---|---|---|---|---|---|---|---|---|---|---|---|---|
| Ex. 1 | 2.00 | 5.76 | 9.38 | 14.72 | 6.21 | −0.46 | −5.01 | 12.05 | 0.61 | 23 | 95 | −1.7 | −25.2 | −27 | −645 |
| Ex. 2 | 2.00 | 5.67 | 9.38 | 13.34 | 6.17 | −0.27 | −7.00 | 11.36 | 0.60 | 23 | 95 | −1.0 | −15.1 | −28 | −630 |
| Ex. 3 | 2.00 | 5.73 | 9.23 | 14.81 | 5.98 | −0.50 | −7.15 | 12.02 | 0.62 | 22 | 90 | −1.8 | −26.2 | −40 | −959 |
| Ex. 4 | 2.47 | 5.95 | 9.05 | 15.17 | 5.34 | −0.29 | −5.21 | 12.11 | 0.66 | 22 | 100 | −0.9 | −13.5 | −32 | −772 |
| Ex. 5 | 1.73 | 6.12 | 8.16 | 12.96 | 6.35 | −0.83 | −5.45 | 10.56 | 0.75 | 23 | 94 | −1.7 | −24.2 | −26 | −552 |
| Ex. 6 | 1.69 | 6.56 | 9.34 | 18.40 | 6.17 | −0.94 | −2.93 | 13.87 | 0.70 | 23 | 100 | −2.6 | −41.5 | −27 | −736 |
| Ex. 7 | 1.55 | 5.21 | 6.16 | 16.49 | 6.53 | 0.90 | −2.78 | 11.33 | 0.85 | 23 | 91 | 0.9 | 9.7 | −29 | −650 |
| Ex. 8 | 1.84 | 5.28 | 6.83 | 23.85 | 6.30 | 0.44 | −1.48 | 15.34 | 0.77 | 22 | 91 | 0.7 | 8.3 | −25 | −773 |
| Ex. 9 | 1.72 | 5.98 | 8.82 | 15.82 | 6.75 | −0.53 | −4.30 | 12.32 | 0.68 | 24 | 101 | −1.5 | −22.3 | −30 | −742 |
| Ex. 10 | 1.77 | 6.08 | 9.21 | 14.46 | 6.49 | −0.72 | −8.10 | 11.84 | 0.66 | 24 | 99 | −2.3 | −34.5 | −43 | −1007 |
| Ex. 11 | 2.3 | 5.12 | 7.53 | 14.93 | 6.42 | 0.42 | −5.32 | 11.23 | 0.68 | 24 | 95 | 1.0 | 12.8 | −39 | −884 |
| Ex. 12 | 1.7 | 6.06 | 11.04 | 15.00 | 6.31 | −0.35 | −9.05 | 13.02 | 0.55 | 23 | 100 | −1.7 | −29.8 | −36 | −933 |

In accordance with the foregoing, the present optical fibers typically have the following properties: (i) a central core radius $r_1$ of between 4.9 microns and 6.6 microns; (ii) a ratio (i.e., $r_1/r_2$) of the central core's radius to the intermediate cladding's radius of between 0.5 and 0.9; (iii) a mean value (i.e., $(r_2+r_3)/2$) of the intermediate cladding's radius and the buried trench's radius of between 9.5 microns and 15.5 microns; (iv) a maximum central-core refractive-index difference $\Delta n_1$ of between $5.3 \times 10^{-3}$ and $7.0 \times 10^{-3}$; (v) an intermediate-cladding refractive-index difference $\Delta n_2$ of between $-1 \times 10^{-3}$ and $1 \times 10^{-3}$; (vi) a buried-trench refractive-index difference $\Delta n_3$ of between $-10 \times 10^{-3}$ and $-1.4 \times 10^{-3}$; (vii) a central-core surface integral $V_{01}$ of between $22 \times 10^{-3}$ micron and $25 \times 10^{-3}$ micron; (viii) a central-core volume integral $V_{11}$ of between $87 \times 10^{-3}$ µm² and $103 \times 10^{-3}$ µm²; (ix) a buried-trench surface integral $V_{03}$ of between $-45 \times 10^{-3}$ micron and $-25 \times 10^{-3}$ micron; and (x) a buried-trench volume integral $V_{13}$ of between $-1020 \times 10^{-3}$ µm² and $-500 \times 10^{-3}$ µm².

These optical-fiber properties are provided as exemplary ranges in Table 7 (below):

TABLE 7

| $r_1$ | $r_1/r_2$ | $(r_2+r_3)/2$ | $\Delta n_1$ | $\Delta n_2$ | $\Delta n_3$ | $V_{01}$ | $V_{11}$ | $V_{03}$ | $V_{13}$ |
|---|---|---|---|---|---|---|---|---|---|
| [4.9, 6.6] | [0.5, 0.9] | [9.5, 15.5] | [5.3, 7.0] | [−1, +1] | [−10, −1.5] | [22, 25] | [87, 103] | [−45, −25] | [−1020, −500] |

Table 8 (below) shows optical transmission characteristics for optical fibers having the refractive-index profiles depicted in Table 6.

TABLE 8

| | cable cut-off wavelength (nm) | fiber cut-off wavelength (nm) | ZDW (nm) | ZDS (ps/(nm²·km)) | MFD (@ 1310 nm) (µm) | MFD (@ 1550 nm) (µm) |
|---|---|---|---|---|---|---|
| Ex. 1 | 1202 | 1280 | 1319 | 0.090 | 8.78 | 9.84 |
| Ex. 2 | 1189 | 1255 | 1319 | 0.091 | 8.82 | 9.88 |
| Ex. 3 | 1227 | 1377 | 1317 | 0.091 | 8.82 | 9.86 |
| Ex. 4 | 1244 | 1251 | 1307 | 0.092 | 9.32 | 10.3 |

TABLE 8-continued

|  | cable cut-off wavelength (nm) | fiber cut-off wavelength (nm) | ZDW (nm) | ZDS (ps/(nm²·km)) | MFD (@ 1310 nm) (μm) | MFD (@ 1550 nm) (μm) |
|---|---|---|---|---|---|---|
| Ex. 5 | 1161 | 1347 | 1312 | 0.092 | 8.68 | 9.63 |
| Ex. 6 | 1260 | 1222 | 1316 | 0.091 | 9.01 | 10.1 |
| Ex. 7 | 1179 | 1374 | 1312 | 0.092 | 8.6 | 9.56 |
| Ex. 8 | 1257 | 1270 | 1324 | 0.089 | 8.81 | 9.95 |
| Ex. 9 | 1251 | 1353 | 1320 | 0.091 | 8.64 | 9.66 |
| Ex. 10 | 1260 | 1351 | 1316 | 0.092 | 8.7 | 9.69 |
| Ex. 11 | 1259 | 1414 | 1313 | 0.092 | 8.6 | 9.54 |
| Ex. 12 | 1256 | 1318 | 1324 | 0.089 | 8.98 | 10.1 |

Table 9 (below) shows bending losses for optical fibers having the refractive-index profiles depicted in Table 6.

TABLE 9

|  | bending losses (@ 1550 nm) (dB/turn) | | | | bending losses (@ 1625 nm) (dB/turn) | | | |
|---|---|---|---|---|---|---|---|---|
|  | 15-mm bend radius | 10-mm bend radius | 7.5-mm bend radius | 5-mm bend radius | 15-mm bend radius | 10-mm bend radius | 7.5-mm bend radius | 5-mm bend radius |
| Ex. 1 | 0.00063 | 0.018 | 0.07 | 0.17 | 0.0038 | 0.056 | 0.16 | 0.39 |
| Ex. 2 | 0.00090 | 0.026 | 0.11 | 0.25 | 0.0052 | 0.079 | 0.23 | 0.55 |
| Ex. 3 | 0.00067 | 0.010 | 0.03 | 0.06 | 0.0036 | 0.029 | 0.07 | 0.14 |
| Ex. 4 | 0.00112 | 0.020 | 0.06 | 0.14 | 0.0055 | 0.054 | 0.14 | 0.31 |
| Ex. 5 | 0.00148 | 0.036 | 0.14 | 0.31 | 0.0089 | 0.112 | 0.32 | 0.7 |
| Ex. 6 | 0.00043 | 0.009 | 0.03 | 0.09 | 0.0023 | 0.027 | 0.07 | 0.23 |
| Ex. 7 | 0.00143 | 0.024 | 0.08 | 0.19 | 0.0082 | 0.072 | 0.18 | 0.45 |
| Ex. 8 | 0.00054 | 0.008 | 0.04 | 0.41 | 0.0027 | 0.026 | 0.10 | 1.13 |
| Ex. 9 | 0.00009 | 0.005 | 0.02 | 0.07 | 0.0007 | 0.016 | 0.06 | 0.16 |
| Ex. 10 | 0.00009 | 0.003 | 0.01 | 0.03 | 0.0006 | 0.011 | 0.03 | 0.08 |
| Ex. 11 | 0.00006 | 0.003 | 0.01 | 0.04 | 0.0005 | 0.011 | 0.04 | 0.1 |
| Ex. 12 | 0.00028 | 0.008 | 0.03 | 0.08 | 0.0016 | 0.024 | 0.07 | 0.17 |

An optical fiber in accordance with the present invention may be obtained by drawing a preform. The preform may be constituted from a tube of high-quality glass (pure silica) that forms a portion of the outer cladding. This tube may then be overclad to increase its diameter prior to fiber drawing within a fiber-drawing tower. In order to fabricate the preform, the tube is generally mounted horizontally and held at both ends by glass bars in a glass-making lathe. Thereafter, the tube is rotated and heated locally for depositing components that determine the composition of the preform. Those of ordinary skill in the art will appreciate that the composition of the preform determines the optical characteristics of the final fiber.

In this regard, the central core, the intermediate cladding, and the buried trench are typically obtained by chemical vapor deposition (CVD) in a tube of silica. The outer cladding is typically formed from the silica tube and the overcladding of the silica tube. The outer cladding may be made of undoped (e.g., natural) or doped silica.

The foregoing notwithstanding, other techniques may be used to form the preform. For example, vapor axial deposition (VAD), outside vapor deposition (OVD), and/or plasma chemical vapor deposition (PCVD) may be employed.

By way of further example, the buried trench may be formed using plasma chemical vapor deposition (PCVD), thereby enabling a large quantity of fluorine to be incorporated into the silica; doping the silica with fluorine facilitates the formation of a deeply buried trench. Alternatively, the buried trench may be formed by incorporating microholes or microbubbles into the silica.

Optical fibers in accordance with the present invention are well suited for use in various optical communication systems. Because the present optical fibers typically have low bending losses, the present optical fibers are particularly suited for installations (e.g., fiber-to-the-home (FTTH) systems) where the optical fiber is subjected to significant bending stresses (e.g., due to the miniaturization of optical boxes or fastening by means of staples). Accordingly, the present optical fibers can placed in optical boxes that are particularly compact. For example, within an optical box, the optical fibers may be arranged with a radius of curvature (i.e., bending radius) of less than 15 millimeters (e.g., a radius of curvature of less than 5 millimeters).

The present optical fibers are suitable for many optical communication systems, because the present optical fibers are typically compatible with conventional optical fibers. For example, the present optical fibers are typically compatible with conventional optical fibers with respect to mode field diameter, thereby facilitating good fiber-to-fiber coupling.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

As noted, the present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, the primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located at the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically)

around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Patent Application Publication No. US2011/0044595 A1 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Patent Application Publication No. US2010/0254653 A1 for a Multimode Fiber, filed Apr. 22, 2010, (Molin et al.); U.S. patent application Ser. No. 12/794,229 for a Large Bandwidth Multimode Optical Fiber Having a Reduced Cladding Effect, filed Jun. 4, 2010, (Molin et al.); U.S. patent application Ser. No. 12/878,449 for a Multimode Optical Fiber Having Improved Bending Losses, filed Sep. 9, 2010, (Molin et al.); U.S. patent application Ser. No. 12/884,834 for a Multimode Optical Fiber, filed Sep. 17, 2010, (Molin et al.); U.S. patent application Ser. No. 12/887,813 for an Optical Fiber for Sum-Frequency Generation, filed Sep. 22, 2010, (Richard et al.); U.S. patent application Ser. No. 12/944,422 for a Rare-Earth-Coped Optical Fiber Having Small Numerical Aperture, filed Nov. 11, 2010, (Boivin et al.); U.S. patent application Ser. No. 12/953,948 for a High-Bandwidth, Multimode Optical Fiber with Reduced Cladding Effect, filed Nov. 24, 2010, (Molin et al.); U.S. patent application Ser. No. 12/954,036 for a High-Bandwidth, Dual-Trench-Assisted Multimode Optical Fiber, filed Nov. 24, 2010, (Molin et al.); U.S. patent application Ser. No. 12/959,688 for a Multimode Optical Fiber with Low Bending Losses and Reduced Cladding Effect, filed Dec. 3, 2010, (Molin et al.); U.S. patent application Ser. No. 12/959,866 for a High-Bandwidth Multimode Optical Fiber Having Reduced Bending Losses, filed Dec. 3, 2010, (Molin et al.); U.S. patent application Ser. No. 13/017,089 for a Non-Zero Dispersion Shifted Optical Fiber Having a Large Effective Area, filed Jan. 31, 2011, (Sillard et al.); and U.S. patent application Ser. No. 13/017,092 for a Non-Zero Dispersion Shifted Optical Fiber Having a Short Cutoff Wavelength, filed Jan. 31, 2011, (Sillard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color- Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. patent application Ser. No. 12/843,116 for a Tight-Buffered Optical Fiber Unit Having Improved Accessibility, filed Jul. 26, 2010, (Risch et al.); U.S. patent application Ser. No. 12/881,598 for Methods and Devices for Cable Insertion into Latched Conduit, filed Sep. 14, 2010, (Leatherman et al.); U.S. patent application Ser. No. 12/907,241 for a High-Fiber-Density Optical-Fiber Cable, filed Oct. 19, 2010, (Overton et al.); U.S. patent application Ser. No. 12/907,265 for an Optical-Fiber Cable Having High Fiber Count and High Fiber Density, filed Oct. 19, 2010, (Tatat et al.); and U.S. patent application Ser. No. 13/009,118 for a Water-Soluble Water-Blocking Element, filed Jan. 19, 2011, (Parris).

In the specification and/or FIGURE, typical embodiments of the invention have been disclosed. The present invention is not limited to such exemplary embodiments. The use of the term "and/or" includes any and all combinations of one or more of the associated listed items. The FIGURE is a schematic representation and so is not necessarily drawn to scale. Unless otherwise noted, specific terms have been used in a generic and descriptive sense and not for purposes of limitation.

The invention claimed is:
1. A single-mode optical fiber, comprising:
a central core surrounded by an outer cladding, said central core having (i) a radius $r_1$, (ii) a positive, maximum refractive-index difference $\Delta n_1$ with respect to said outer cladding, and (iii) an alpha refractive-index profile with an alpha parameter $\alpha$ of between 1.5 and 2.5;
an intermediate cladding positioned between said central core and said outer cladding, said intermediate cladding having a radius $r_2$ and a refractive-index difference $\Delta n_2$ with respect to said outer cladding; and a buried trench positioned between said intermediate cladding and said outer cladding, said buried trench having a radius $r_3$ and a negative refractive-index difference $\Delta n_3$ with respect to said outer cladding;

wherein the optical fiber has (i), at a wavelength of 1310 nanometers, a mode field diameter with a nominal value of between 8.6 microns and 9.5 microns and a tolerance of ±0.4 micron, (ii) a cable cut-off wavelength of 1260 nanometers or less, and (iii), for a bending radius of 15 millimeters at a wavelength of 1550 nanometers, bending losses of 0.003 dB/turn or less.

2. A single-mode optical fiber according to claim 1, wherein said central core has a surface integral $V_{01}$ of between about $22 \times 10^{-3}$ micron and $25 \times 10^{-3}$ micron, the surface integral $V_{01}$ being defined according to the following equation:

$$V_{01} = \int_0^{r_1} \Delta n(r) \cdot dr \approx r_1 \times (\text{alpha} \cdot \Delta n_1 + \Delta n_2)/(\text{alpha} + 1).$$

3. A single-mode optical fiber according to claim 1, wherein said buried trench has a surface integral $V_{03}$ of between about $-45 \times 10^{-3}$ micron and $-25 \times 10^{-3}$ micron, the surface integral $V_{03}$ being defined according to the following equation:

$$V_{03} = \int_{r_2}^{r_3} \Delta n(r) \cdot dr \approx (r_3 - r_2) \times \Delta n_3.$$

4. A single-mode optical fiber according to claim 1, wherein said central core has a volume integral $V_{11}$ of between about $87 \times 10^{-3}$ μm$^2$ and $103 \times 10^{-3}$ μm$^2$, the volume integral $V_{11}$ being defined according to the following equation:

$$V_{11} = 2 \cdot \int_0^{r_1} \Delta n(r) \cdot r \cdot dr \approx r_1^2 \times (\text{alpha} \cdot \Delta n_1 + 2 \cdot \Delta n_2)/(\text{alpha} + 2).$$

5. A single-mode optical fiber according to claim 1, wherein said buried trench has a volume integral $V_{13}$ of between about $-1020 \times 10^{-3}$ μm$^2$ and $-500 \times 10^{-3}$ μm$^2$, the volume integral $V_{13}$ being defined according to the following equation:

$$V_{13} = 2 \cdot \int_{r_2}^{r_3} \Delta n(r) \cdot r \, dr \approx (r_3^2 - r_2^2) \times \Delta n_3.$$

6. A single-mode optical fiber according to claim 1, wherein said central core has a radius $r_1$ of between about 4.9 microns and 6.6 microns.

7. A single-mode optical fiber according to claim 1, wherein the ratio ($r_1/r_2$) of said central core's radius $r_1$ to said intermediate cladding's radius $r_2$ is between about 0.5 and 0.9.

8. A single-mode optical fiber according to claim 1, wherein the mean $((r_2+r_3)/2)$ of said intermediate cladding's radius $r_2$ and said buried trench's radius $r_3$ is between about 9.5 microns and 15.5 microns.

9. A single-mode optical fiber according to claim 1, wherein said central core's maximum refractive-index difference $\Delta n_1$ is between about $5.3 \times 10^{-3}$ and $7.0 \times 10^{-3}$.

10. A single-mode optical fiber according to claim 1, wherein said intermediate cladding's refractive-index difference $\Delta n_2$ is between about $-1 \times 10^{-3}$ and $1 \times 10^{-3}$.

11. A single-mode optical fiber according to claim 1, wherein said buried trench's refractive-index difference $\Delta n_3$ is between about $-10 \times 10^{-3}$ and $-1.4 \times 10^{-3}$.

12. A single-mode optical fiber according to claim 1, wherein, for a bending radius of 15 millimeters at a wavelength of 1550 nanometers, the optical fiber has bending losses of between about $0.060 \times 10^{-3}$ dB/turn and $1.48 \times 10^{-3}$ dB/turn.

13. A single-mode optical fiber according to claim 1, wherein, for a bending radius of 10 millimeters at a wavelength of 1550 nanometers, the optical fiber has bending losses of between about $3 \times 10^{-3}$ dB/turn and $36 \times 10^{-3}$ dB/turn.

14. A single-mode optical fiber according to claim 1, wherein, for a bending radius of 7.5 millimeters at a wavelength of 1550 nanometers, the optical fiber has bending losses of between about 0.01 dB/turn and 0.14 dB/turn.

15. A single-mode optical fiber according to claim 1, wherein, for a bending radius of 5 millimeters at a wavelength of 1550 nanometers, the optical fiber has bending losses of between about 0.03 dB/turn and 0.41 dB/turn.

16. A single-mode optical fiber according to claim 1, wherein, for a bending radius of 15 millimeters at a wavelength of 1625 nanometers, the optical fiber has bending losses of between about $0.5 \times 10^{-3}$ dB/turn and $8.9 \times 10^{-3}$ dB/turn.

17. A single-mode optical fiber according to claim 1, wherein, for a bending radius of 10 millimeters at a wavelength of 1625 nanometers, the optical fiber has bending losses of between about 0.011 dB/turn and 0.112 dB/turn.

18. A single-mode optical fiber according to claim 1, wherein, for a bending radius of 7.5 millimeters at a wavelength of 1625 nanometers, the optical fiber has bending losses of between about 0.03 dB/turn and 0.32 dB/turn.

19. A single-mode optical fiber according to claim 1, wherein, for a bending radius of 5 millimeters at a wavelength of 1625 nanometers, the optical fiber has bending losses of between about 0.08 dB/turn and 1.13 dB/turn.

20. A single-mode optical fiber according to claim 1, wherein the optical fiber has a zero-chromatic-dispersion wavelength of between 1300 nanometers and 1324 nanometers.

21. A single-mode optical fiber according to claim 1, wherein, at the zero-chromatic-dispersion wavelength, the optical fiber has a chromatic dispersion slope of 0.092 ps/(nm$^2$~km) or less.

22. A single-mode optical fiber according to claim 1, wherein the optical fiber complies with the ITU-T G.657.A2 recommendations.

23. A single-mode optical fiber according to claim 1, wherein:
 the optical fiber complies with the ITU-T G.652.D recommendations;
 the optical fiber has, at a wavelength of 1550 nanometers, (i) bending losses of no more than 0.03 dB/turn for a bending radius of 10 millimeters, (ii) bending losses of no more than 0.08 dB/turn for a bending radius of 7.5 millimeters, and (iii) bending losses of no more than 0.15 dB/turn for a bending radius of 5 millimeters; and
 the optical fiber has, at a wavelength of 1625 nanometers, (i) bending losses of no more than 0.01 dB/turn for a bending radius of 15 millimeters, (ii) bending losses of no more than 0.1 dB/turn for a bending radius of 10 millimeters, (iii) bending losses of no more than 0.25 dB/turn for a bending radius of 7.5 millimeters, and (iv) bending losses of no more than 0.45 dB/turn for a bending radius of 5 millimeters.

24. An optical box comprising at least a portion of an optical fiber according to claim 1.

25. A fiber-to-the-home (FTTH) system comprising at least a portion of an optical fiber according to claim 1.

26. A single-mode optical fiber comprising:
a central core surrounded by an outer cladding, said central core having (i) a radius $r_1$ of between 4.9 microns and 6.6 microns, (ii) a maximum refractive-index difference $\Delta n_1$ with respect to said outer cladding of between $5.3 \times 10^{-3}$ and $7.0 \times 10^{-3}$, and (iii) an alpha refractive-index profile with an alpha parameter $\alpha$ of between 1.5 and 2.5;
an intermediate cladding positioned between said central core and said outer cladding, said intermediate cladding having a radius $r_2$ and a refractive-index difference $\Delta n_2$ with respect to said outer cladding of between $-1 \times 10^{-3}$ and $1 \times 10^{-3}$; and
a buried trench positioned between said intermediate cladding and said outer cladding, said buried trench having a radius $r_3$ and a negative refractive-index difference $\Delta n_3$ with respect to said outer cladding of between $-10 \times 10^{-3}$ and $-1.4 \times 10^{-3}$.

27. A single-mode optical fiber according to claim 26, wherein:
the ratio $(r_1/r_2)$ of said central core's radius $r_1$ to said intermediate cladding's radius $r_2$ is between 0.5 and 0.9; and
the mean $((r_2+r_3)/2)$ of said intermediate cladding's radius $r_2$ and said buried trench's radius $r_3$ is between 9.5 microns and 15.5 microns.

28. A single-mode optical fiber according to claim 26, wherein the optical fiber complies with the ITU-T G.657.A1 recommendations.

29. A single-mode optical fiber according to claim 26, wherein the optical fiber complies with the ITU-T G.657.A2 recommendations.

30. A single-mode optical fiber comprising:
a central core surrounded by an outer cladding, said central core having (i) a radius $r_1$, (ii) a positive, maximum refractive-index difference $\Delta n_1$ with respect to said outer cladding, (iii) an alpha refractive-index profile with an alpha parameter $\alpha$ of between 1.5 and 2.5, (iv) a surface integral $V_{01}$ of between $22 \times 10^{-3}$ micron and $25 \times 10^{-3}$ micron, and (v) a volume integral $V_{11}$ of between $87 \times 10^{-3}$ $\mu m^2$ and $103 \times 10^{-3}$ $\mu m^2$, the surface integral $V_{01}$ and the volume integral $V_{11}$ being defined according to the following equations:

$$V_{01} = \int_0^{r_1} \Delta n(r) \cdot dr \approx r_1 \times (\text{alpha} \cdot \Delta n_1 + \Delta n_2)/(\text{alpha} + 1)$$

$$V_{11} = 2 \cdot \int_0^{r_1} \Delta n(r) \cdot r \cdot dr \approx r_1^2 \times (\text{alpha} \cdot \Delta n_1 + 2 \cdot \Delta n_2)/(\text{alpha} + 2);$$

an intermediate cladding positioned between said central core and said outer cladding, said intermediate cladding having a radius $r_2$ and a refractive-index difference $\Delta n_2$ with respect to said outer cladding; and
a buried trench positioned between said intermediate cladding and said outer cladding, said buried trench having (i) a radius $r_3$, (ii) a negative refractive-index difference $\Delta n_3$ with respect to said outer cladding, (iii) a surface integral $V_{03}$ of between $-45 \times 10^{-3}$ micron and $-25 \times 10^{-3}$ micron, and (iv) a volume integral $V_{13}$ of between $-1020 \times 10^{-3}$ $\mu m^2$ and $-500 \times 10^{-3}$ $\mu m^2$, the surface integral $V_{03}$ and the volume integral $V_{13}$ being defined according to the following equations:

$$V_{03} = \int_{r_2}^{r_3} \Delta n(r) \cdot dr \approx (r_3 - r_2) \times \Delta n_3$$

$$V_{13} = 2 \cdot \int_{r_2}^{r_3} \Delta n(r) \cdot r dr \approx (r_3^2 - r_2^2) \times \Delta n_3.$$

* * * * *